(12) United States Patent
Taori et al.

(10) Patent No.: US 10,575,182 B2
(45) Date of Patent: Feb. 25, 2020

(54) METHODS AND SYSTEMS FOR CHANNEL MAPPING IN A COMMUNICATION NETWORK

(71) Applicant: Phazr, Inc., Allen, TX (US)

(72) Inventors: Rakesh Taori, McKinney, TX (US);
Shadi Abu-Surra, Plano, TX (US);
Farooq Khan, Allen, TX (US); Eran Pisek, Plano, TX (US); Sudhir Ramakrishna, Plano, TX (US); Robert Clark Daniels, Round Rock, TX (US)

(73) Assignee: Phazr, Inc., Allen, TX (US)

(*) Notice: Subject to any disclaimer, the term of this patent is extended or adjusted under 35 U.S.C. 154(b) by 146 days.

(21) Appl. No.: 15/345,667

(22) Filed: Nov. 8, 2016

(65) Prior Publication Data
US 2018/0132108 A1    May 10, 2018

(51) Int. Cl.
*H04W 16/10* (2009.01)
*H04W 16/14* (2009.01)

(52) U.S. Cl.
CPC .......... *H04W 16/10* (2013.01); *H04W 16/14* (2013.01)

(58) Field of Classification Search
None
See application file for complete search history.

(56) References Cited

U.S. PATENT DOCUMENTS

| | | | |
|---|---|---|---|
| 2002/0142788 A1* | 10/2002 | Chawla | H04W 16/18 455/504 |
| 2003/0050008 A1* | 3/2003 | Patterson | H04B 7/18578 455/12.1 |
| 2013/0094409 A1* | 4/2013 | Li | H04W 72/044 370/280 |
| 2014/0248917 A1* | 9/2014 | Scipione | H04W 72/0406 455/509 |
| 2016/0338037 A1* | 11/2016 | Ode | H04W 8/22 |
| 2017/0105152 A1* | 4/2017 | Lou | H04W 36/08 |
| 2017/0118750 A1* | 4/2017 | Kikuma | H04W 72/02 |
| 2019/0081688 A1* | 3/2019 | Deenoo | H04B 7/0695 |

* cited by examiner

*Primary Examiner* — Charles N Appiah
*Assistant Examiner* — Frank E Donado
(74) *Attorney, Agent, or Firm* — Michael A. Rahman

(57) ABSTRACT

Methods and systems for channel mapping in a densely deployed network are disclosed. The system includes a node comprising a plurality of base stations configured to communicate with client devices in a wireless communication network, wherein transmission from the base stations to the client devices is conducted on a downlink (DL) frequency band and transmission from the client devices to the base stations is conducted on an uplink (UL) frequency band. The DL frequency band is different from the UL frequency band. DL and UL frequency pairs for the base stations are assigned according to a channel mapping scheme that determines DL and UL frequency pairs based on a plurality of channel parameters. The channel parameters include, for example, received signal strength indicator (RSSI), signal to noise (S/N) ratio, channel capacity, and bit error rate (BER).

11 Claims, 15 Drawing Sheets

METHODS AND SYSTEMS FOR CHANNEL MAPPING IN A COMMUNICATION NETWORK

TECHNICAL FIELD

This application is directed, in general, to wireless communications and, more specifically, to methods and systems for channel mapping in a communication network.

BACKGROUND

Internet connectivity has transformed life everywhere as more people connect to the Internet to chat with friends and family, watch videos, listen to streamed music, or conduct online banking and e-commerce. The two primary means for access to the Internet are wired broadband and wireless. Current wired broadband Internet access is based on three different standards: Digital Subscriber Line (DSL); Data Over Cable Service Interface Specification (DOCSIS); and Fiber-to-Home (FTTH). The wireless access is based on two standards: Wide Area Network (WAN), also referred to as the Fourth Generation Long. Term Evolution (4G LTE); and Local Area Network (LAN), also referred to as Wi-Fi. Wi-Fi is generally used indoors as short-range wireless extension of wired broadband systems. The 4G LTE on the other hand provides wide area long-range connectivity using dedicated infrastructure such as cell towers and backhaul to connect to the Internet.

In order to address the rapid growth in data traffic, next generation WLAN and cellular systems are expected to operate at higher frequencies where abundant spectrum is available. For example, at millimeter wave frequencies (28 GHz and above), radio spectrum use is lighter. A large number of small antennas operating at millimeter wave frequencies may be used to provide the increased capacity in the future. The small size antennas are enabled by carrier waves that are millimeters long compared to centimeter long waves at currently used lower frequencies.

In order to provide Gb/s data rates to users in an urban and sub-urban setting, a highly dense deployment of base stations (BS) or access points (APs) is envisaged. It is fairly common in cellular systems for each BS to have 3 or more sectors. Even with the LTE-advanced deployments, wherein a 3-sector BS serves many tens of users, it is challenging to obtain 10 Gb/s per BS site. With fifth generation (5G) network's goal of providing Gb/s data rates to end users, the number of sectors per BS/AP is expected to increase multifold and the inter site distances (ISDs) are set to reduce. However, a multi-fold increase in the number of sectors per BS/AP along with a reduction in the ISDs will increase interferences in wireless signals. Accordingly, in a densely deployed wireless network, improved interference management in necessary.

SUMMARY

Disclosed embodiments provide methods and systems for channel mapping in a densely deployed network.

In one aspect, a node includes a plurality of base stations or access points configured to communicate with client devices in a wireless communication network, wherein transmission from the base stations to the client devices is conducted on a downlink (DL) frequency band and transmission from the client devices to the base stations is conducted on an uplink (UL) frequency band. The DL frequency band is different from the UL frequency band. DL and UL frequency pairs for the base stations are assigned according to a channel mapping scheme that assigns fixed DL and UL frequency pairs, wherein the difference between the DL and UL center frequency is fixed.

In another aspect, a node includes a plurality of base stations or access points configured to communicate with client devices in a wireless communication network, wherein transmission from the base stations to the client devices is conducted on a downlink (DL) frequency band and transmission from the client devices to the base stations is conducted on an uplink (UL) frequency band. The DL frequency band is different from the UL frequency band. DL and UL frequency pairs for the base stations are assigned according to a channel mapping scheme that assigns fixed DL and UL frequency pairs, wherein the difference between the DL and UL center frequency vary among the allocated DL and UL frequency pairs.

In yet another aspect, a node includes a plurality of base stations configured to communicate with client devices in a wireless communication network, wherein transmission from the base stations to the client devices is conducted on a downlink (DL) frequency band and transmission from the client devices to the base stations is conducted on an uplink (UL) frequency band. The DL frequency band is different from the UL frequency band. DL and UL frequency pairs for the base stations are assigned according to a channel mapping scheme that determines DL and UL frequency pairs based on a plurality of channel parameters. The channel parameters include, for example, received signal strength indicator (RSSI), signal to noise (S/N) ratio, channel capacity, and bit error rate (BER).

In yet another aspect, a method of communication between base stations and client devices in a wireless communication network includes transmitting from the base stations to the client devices on a downlink (DL) frequency band and transmitting from the client devices to the base stations on an uplink (UL) frequency band, wherein the DL frequency band is different from the UL frequency band. The method includes allocating DL and UL frequency pairs for the base stations according to a channel mapping scheme that allocates fixed DL and UL frequency pairs, wherein the difference between the DL and UL center frequency is fixed.

In yet another aspect, a method of communication between base stations and client devices in a wireless communication network includes transmitting from the base stations to the client devices on a downlink (DL) frequency band and transmitting from the client devices to the base stations on an uplink (UL) frequency band, wherein the DL frequency band is different from the UL frequency band. The method includes allocating DL and UL frequency pairs to the base stations according to a channel mapping scheme that allocates fixed DL and UL frequency pairs, wherein the difference between the DL and UL center frequency vary among the allocated DL and UL frequency pairs.

In yet another aspect, a method of communication between base stations and client devices in a wireless communication network includes transmitting from the base stations to the client devices on a downlink (DL) frequency band and transmitting from the client devices to the base stations on an uplink (UL) frequency band, wherein the DL frequency band is different from the UL frequency band. The method includes allocating DL and UL frequency pairs to the base stations according to a channel mapping scheme that determines DL and UL frequency pairs based on a plurality of channel parameters.

BRIEF DESCRIPTION OF THE DRAWINGS

Reference is now made to the following descriptions taken in conjunction with the accompanying drawings, in which.

DETAILED DESCRIPTION

Figure 1:
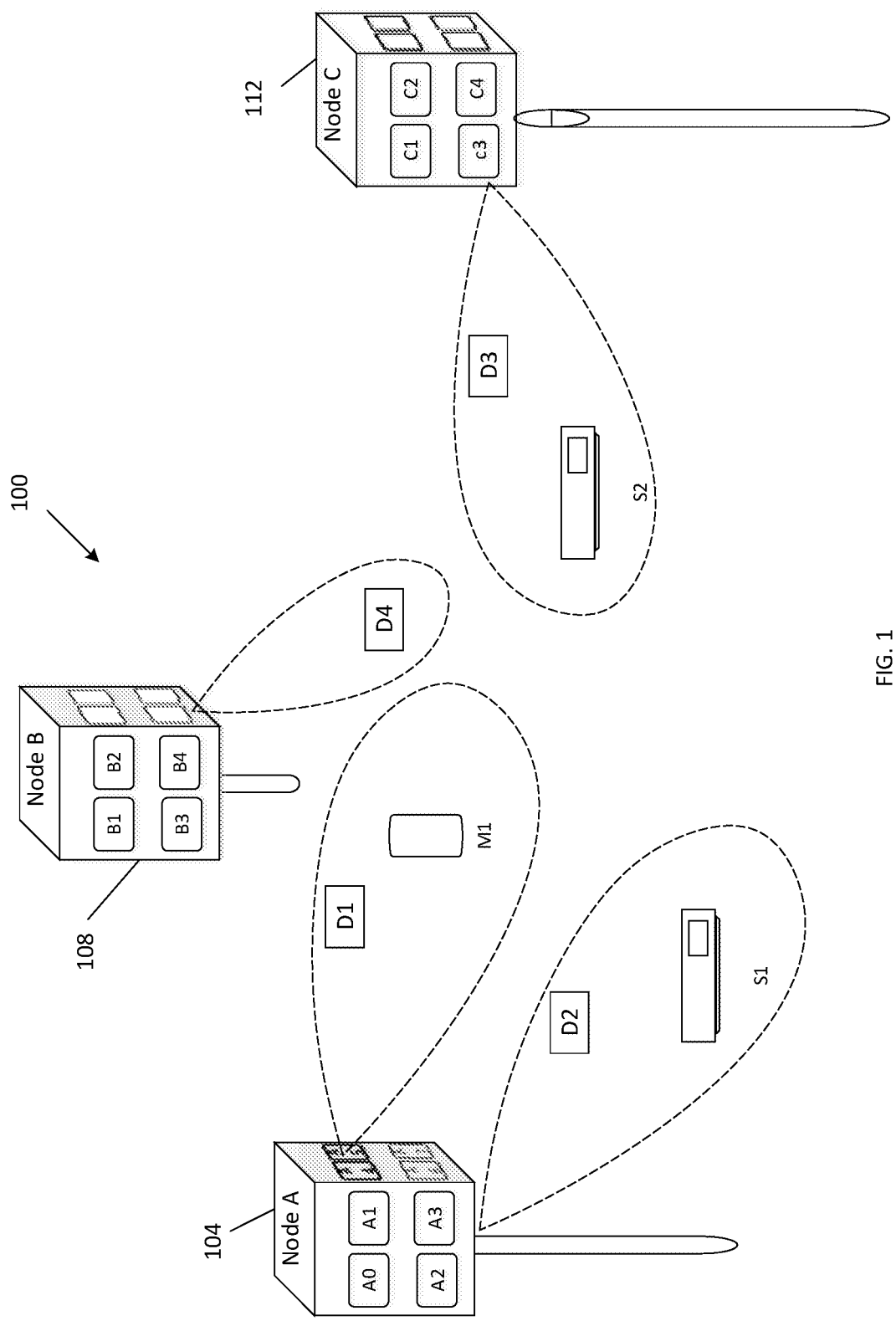
FIG. 1 illustrates a wireless communication system in accordance with disclosed embodiments.

FIG. 1 illustrates a wireless communication system 100 in accordance with disclosed embodiments. System 100 includes a plurality of nodes 104, 108 and 112, each node comprising a plurality of base stations (BS) or access points (APs). According to some disclosed embodiments, nodes 104, 108 and 112 each include 16 BS or APs. The nodes provide approximately 90-degree coverage from each side, thereby providing a complete 360 degrees coverage. As shown in FIG. 1, node 104 includes APs A0-A15, node 108 includes APs B0-B15, and node 112 includes APs C0-C15.

According to disclosed embodiments, the APs or BS include respective transmitters, receivers and antennas configured to transmit and receive wireless signals. The APs or BS communicate with a plurality of client devices (e.g., smartphones, tablets, laptop computers, desktop computers, phablets, etc.) within a coverage area. By way of example, the APs of node 104 communicate with client devices D1, D2, M1 and S1, and the APs of node 112 communicate with client devices D3 and S2.

According to disclosed embodiments, the downlink (DL) transmission and the uplink (UL) transmission are performed on frequency bands that are spaced much farther in frequency than traditional systems. The DL transmission refers to communication from the APs to the client devices and the UL transmission refers to communication between the client devices to the APs on the nodes. The DL transmission and the UL transmission are performed on frequency bands separated by several hundreds of MHz.

According to disclosed embodiments, methods and systems allow dynamic selection of optimal channels for the uplink and downlink transmissions. Furthermore, disclosed embodiments provide signaling schemes and systems to maintain the end points synchronized for optimal channel selections.

In order for a system to interoperate, it is necessary that the receiver of a client device listens to the same 28 GHz channel that the transmitter of an access point is transmitting over, and at the same time the transmitter of the client device selects the same 5 GHz channel for transmission that the receiver of the access point is listening on. While the exemplary embodiments herein utilize 5 GHz band for UL and 28 GHz band for DL, it will be apparent to those skilled in the art that the concepts disclosed herein are applicable to other frequency bands.

Figure 2:
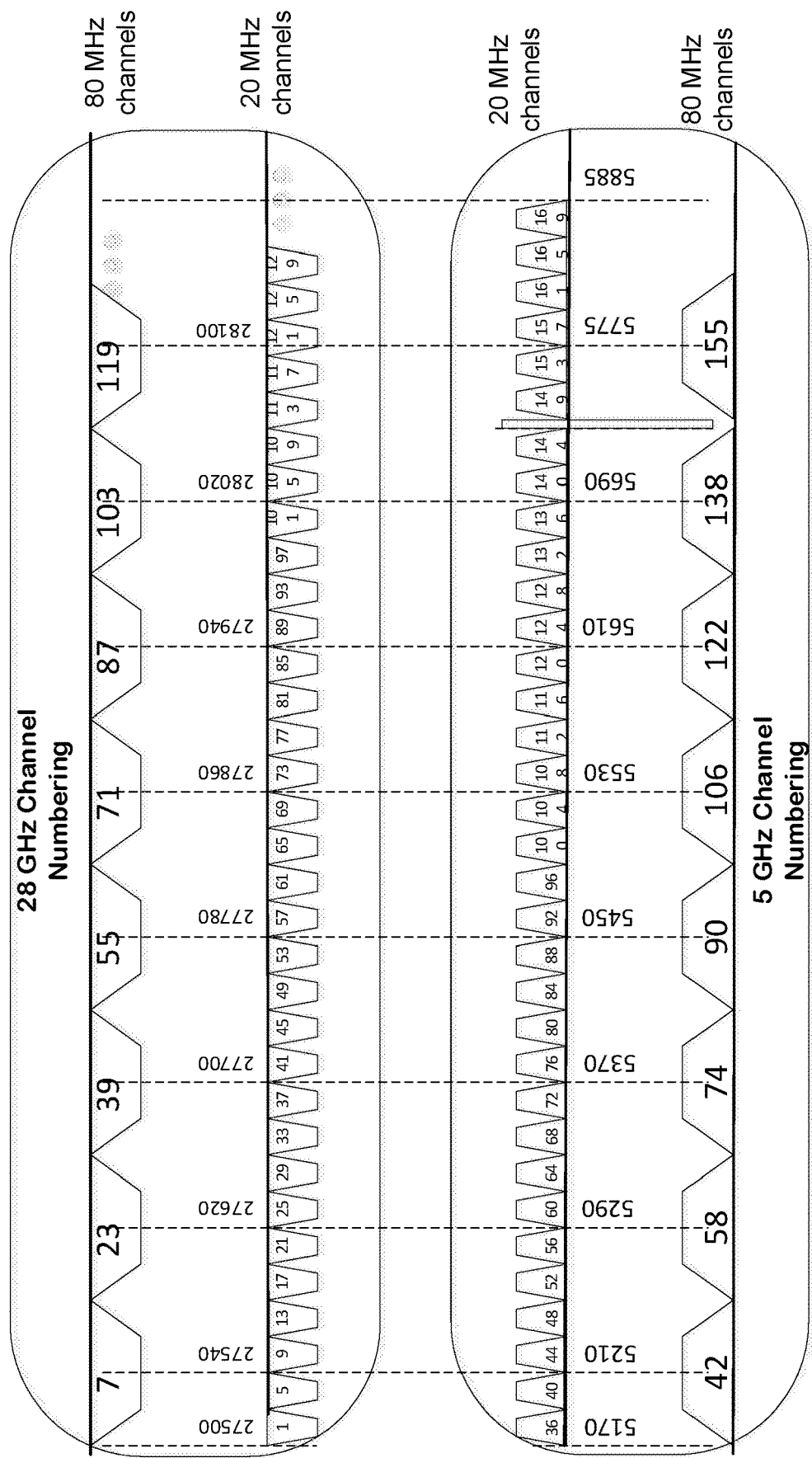
FIG. 2 illustrates channel numbering.

Referring now to the lower half of FIG. 2, the channel numbering used for 20 and 80 MHz channels in accordance with the IEEE 802.11 is shown. The 20 MHz Channel located between 5170 MHz and 5190 MHz, centered at 5180 MHz is numbered as Channel #36, and the 80 MHz channel located between 5170 MHz and 5250 MHz, centered at 5210 MHz, is numbered Channel #42.

Referring now to the upper half of FIG. 2, an exemplary channel numbering scheme for the 28 GHz band is illustrated in accordance with disclosed embodiments. The 28 GHz band begins at 27.5 GHz and is 850 MHz wide. According to disclosed embodiments, channel numbering for the 28 GHz band starts at Channel #1 for a 20 MHz channel located between 27500 MHz and 27520 MHz, centered at 27510 MHz. A grid of 5 MHz is used (i.e., each number represents a 5 GHz channel). Thus, the next channel located between 27520 and 27540, centered at 27530 is numbered Channel #5, and so on until the end of the licensed 28 GHz band (28350 MHz). Thus, the channel numbering in the exemplary scheme using 20 MHz channels facilitate mapping between 5 GHz channels that are widely used for 802.11 channels and the 28 GHz channels, thereby facilitating the use of these frequency bands in the UL and DL. Although in the foregoing embodiment a 5 MHz grid is used, the numbering may start at some other number instead of 1, and that a spacing other than 5 MHz may be chosen.

Figure 3:
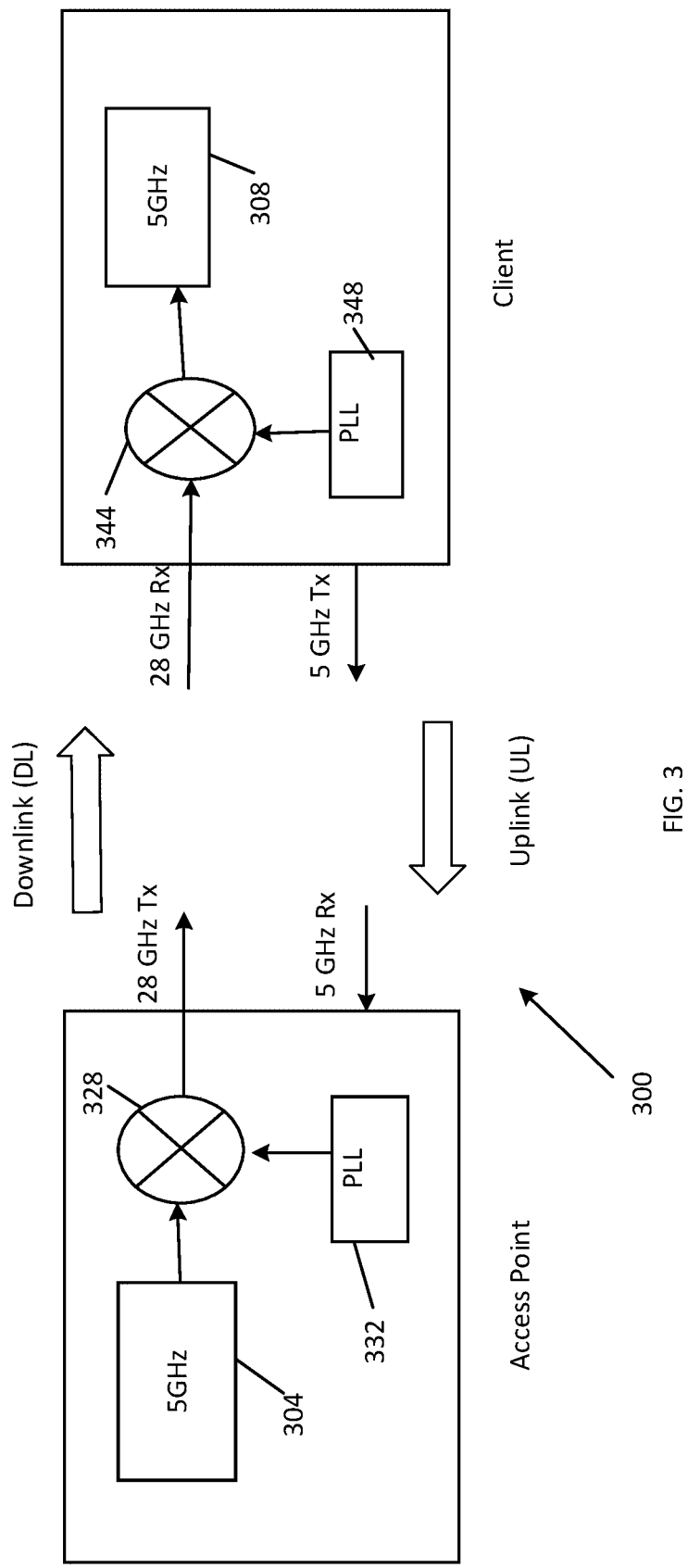
FIG. 3 illustrates a system in accordance with disclosed embodiments.

FIG. 3 illustrates a system 300 which relies on 28 GHz band for DL transmission and 5 GHz band for UL transmission in accordance with disclosed embodiments. System 300 includes AP 304 and client device 308 that communicate wirelessly. As shown in FIG. 3, DL transmission 312 from AP 304 to client device 308 is conducted over the 28 GHz band, while UL transmission 316 from client device 308 to AP 304 is conducted over the 5 GHz band. Since there is a wideband separation between the DL and UL, APs can transmit and receive concurrently. Thus, an AP can transmit on the 28 GHz band and receive in the well-separated 5 GHz band.

According to an exemplary embodiment, AP 304 generates a 5 GHz signal. The 5 GHz signal is converted to a 28 GHz signal by up-converter 328 and phase locked loop (PLL) 332. The 28 GHz signal is then transmitted over the air as DL transmission. The client device 308 receives the 28 GHz signal and down-converts to a 5 GHz signal using down converter 344 and PLL 348.

Figure 4:
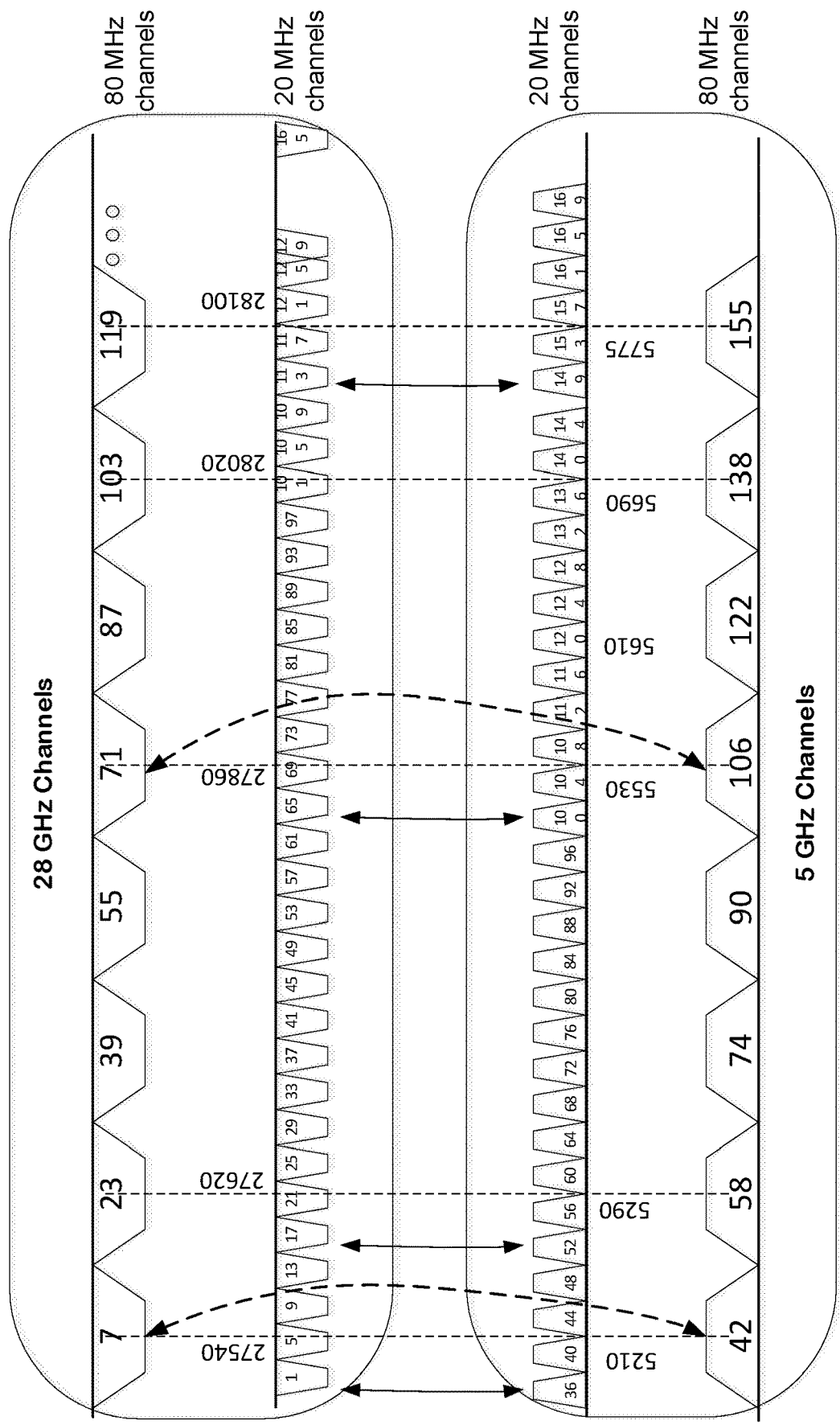
FIG. 4 illustrates a fixed mapping scheme.

According to disclosed embodiments, a fixed mapping of channels with a fixed center frequency separation between different DL and UL pairs is defined to enable system 300 to interoperate. An exemplary fixed mapping is illustrated in FIG. 4, where a 20 MHz channel in the 5 GHz band, channel #36 maps to channel #1 in the 28 GHz band. Thus, if AP 304 receives UL transmission on channel #36 in the 5 GHz band, AP 304 selects channel #1 in the 28 GHz band for DL transmission. Similarly, channel #52 in the 5 GHz band maps to channel #17 in the 28 GHz band, and channel #100 in the 5 GHz band maps to channel #65 in the 28 GHz band.

Figure 5:
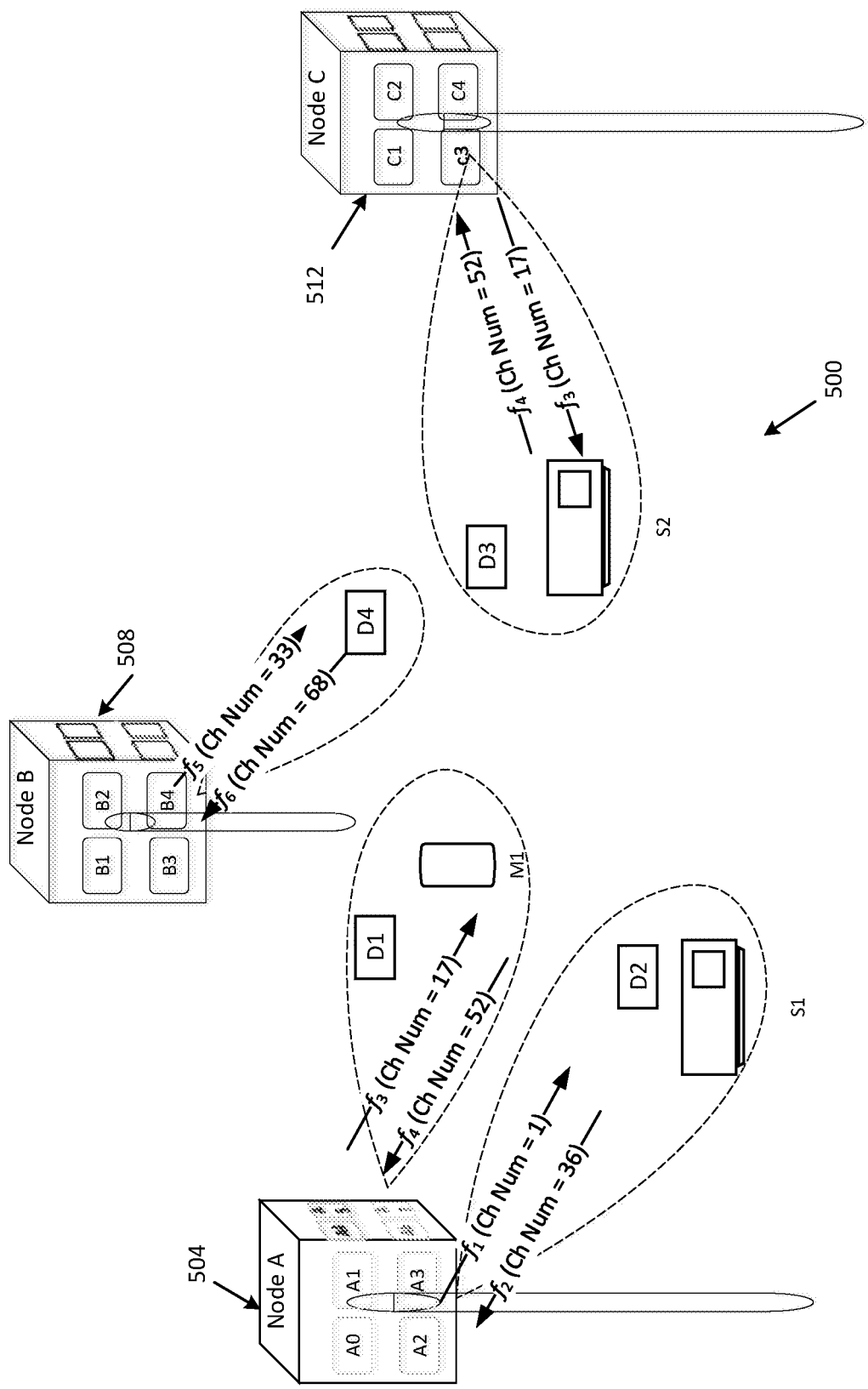
FIG. 5 illustrates a system for a fixed mapping scheme.

FIG. 5 illustrates system 500 for implementing the fixed mapping scheme shown in FIG. 4. For example, on node 504 an AP may choose a predefined [DL, UL] pair [1,36] combination while another AP on node 504 may choose another channel pair [17, 52] that is pre-mapped. Channels #1 and #17 are the DL channels in the 28 GHz band, while channels #36 and #52 are the UL channels in the 5 GHz band. Thus, according to this exemplary fixed channel mapping scheme, the 28 GHz channel #17 used for DL transmission always maps to 5 GHz channel #52 for UL transmission.

Figure 6:
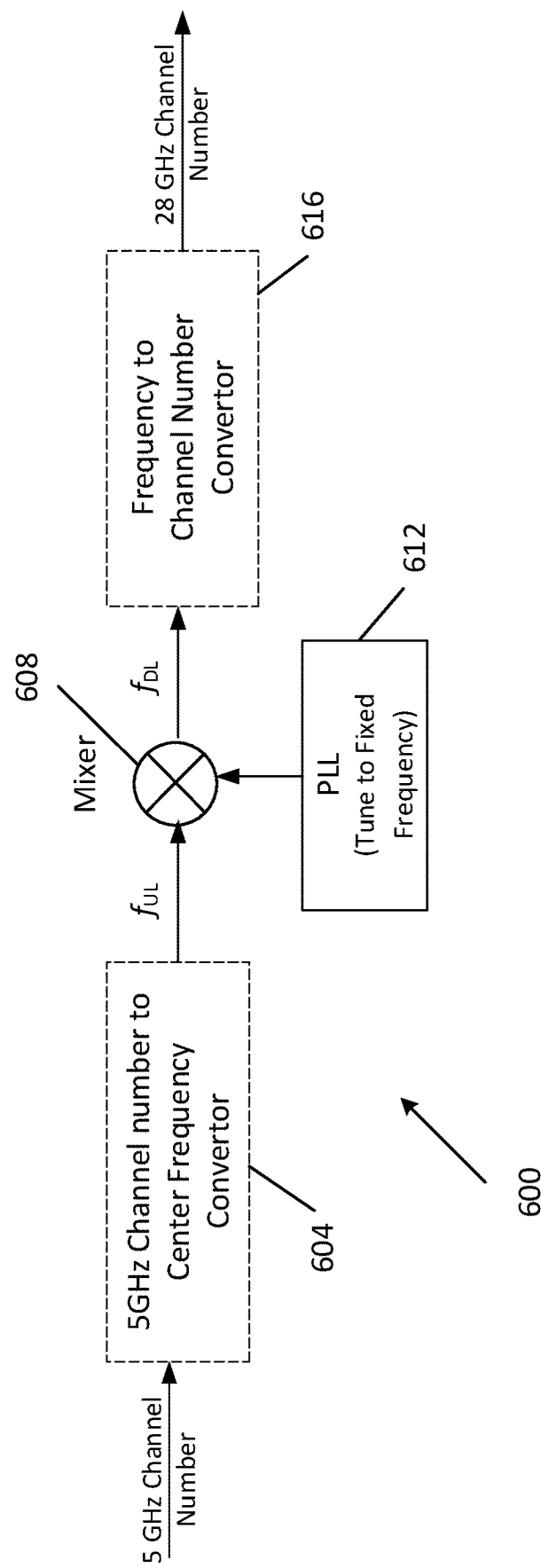
FIG. 6 illustrates an apparatus for a fixed mapping scheme.

FIG. 6 illustrates apparatus 600 for implementing a fixed mapping with a fixed center frequency separation between the DL and the UL frequencies. Apparatus 600 may be incorporated in transmitters and receivers to convert a channel number in the 5 GHz band to a channel number in the 28 GHz band. An exemplary apparatus to accomplish this is illustrated in FIG. 6, where a 5 GHz channel number is converted to a 28 GHz channel number.

As shown in FIG. 6, converter 604 receives a 5 GHz channel number and in response generates UL frequency fUL. Converter 604 is a channel number to center frequency converter that generates UL frequency responsive to a channel number. The UL frequency fUL is then converted to DL frequency fDL by mixer 608 and PLL 612. The DL frequency fDL is converted to a 28 GHz channel number by converter 616, which is frequency to channel number converter.

Figure 7:
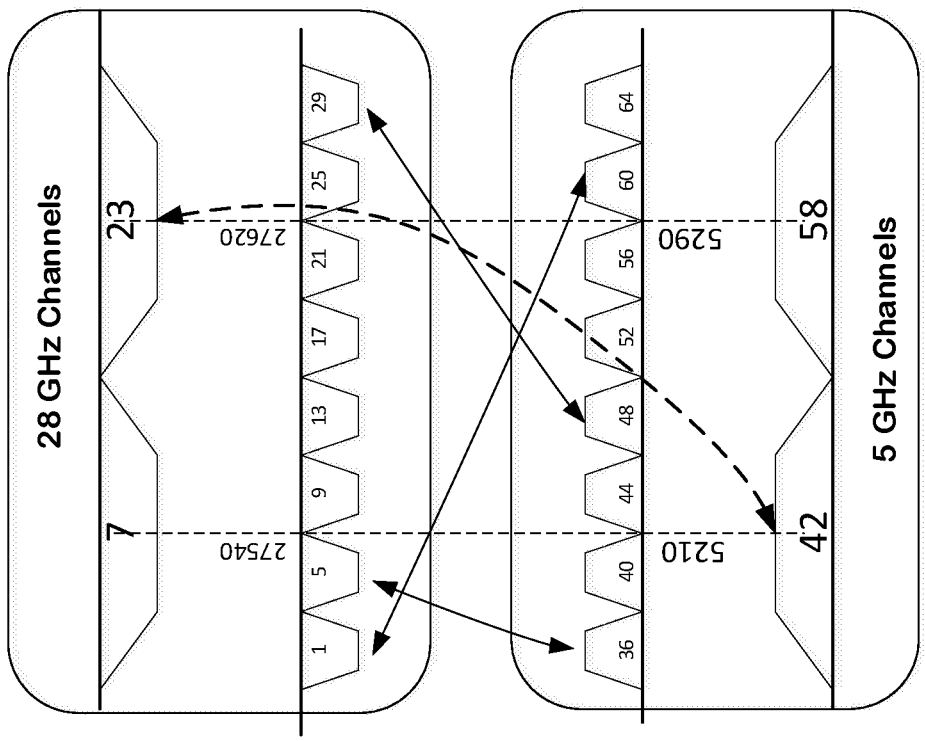
FIG. 7 illustrates another mapping scheme.
Figure 7:
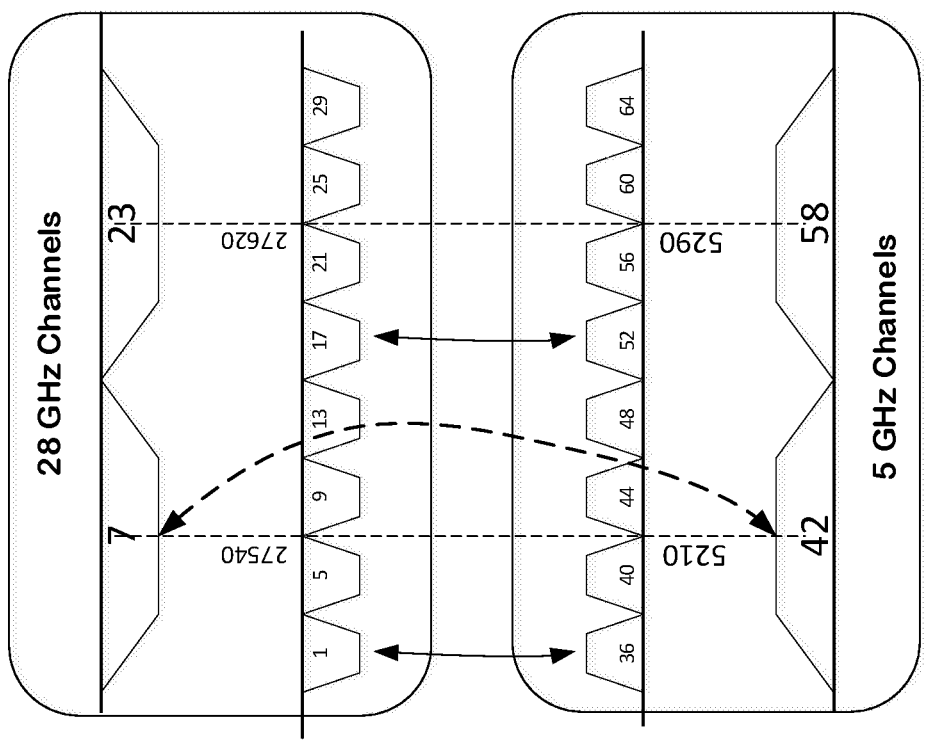

FIG. 7 illustrates another channel mapping scheme according to disclosed embodiments. The scheme shown on the right half of FIG. 7 provides a fixed mapping between channel numbers but does not necessarily translate to a fixed center frequency separation between different DL and UL pairs. Such a scheme that provides a fixed mapping between channel numbers but that does not necessarily translate to a fixed center frequency separation between different DL and UL pairs may be implemented in regulatory domains where channel availability in the unlicensed 5 GHz bands is different.

Referring now to the right half of FIG. 7, a first AP on a node may select [UL, DL]=[5, 36], while a second AP on the same node may select [UL, DL]=[29, 48]. Thus, the center frequency separation between different UL, DL pairs are different.

Figure 8:
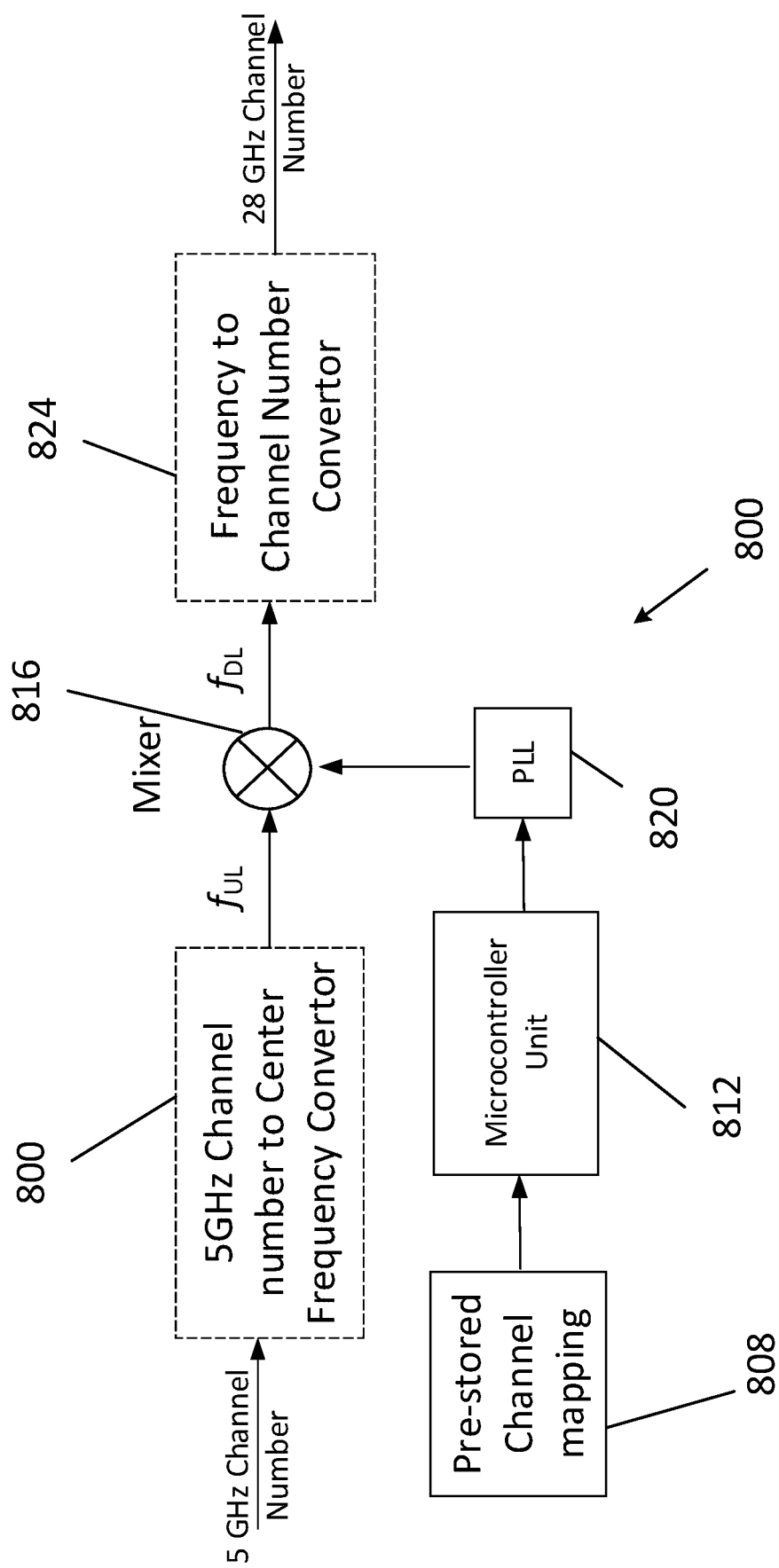
FIG. 8 illustrates an apparatus for implementing a fixed mapping where the center frequency separation between different UL, DL pairs can vary.

FIG. 8 illustrates apparatus 800 for implementing a fixed mapping but where the center frequency separation between different UL, DL pairs can vary. Apparatus 800 may be incorporated in transmitters and receivers to convert a channel number in the 5 GHz band to a channel number in the 28 GHz band. An exemplary apparatus to accomplish this is illustrated in FIG. 8, where a 5 GHz channel number is converted to a 28 GHz channel number.

As shown in FIG. 8, a 5 GHz channel number is received by converter 804 and in response generates UL frequency $f_{UL}$. Converter 804 is a channel number to center frequency converter that generates UL frequency responsive to a channel number. The UL frequency $f_{UL}$ is then converted to DL frequency fDL by mixer 816 and PLL 820. A fixed, system-wide channel mapping scheme is stored in mapping module 808. Responsive to the fixed channel mapping scheme, microcontroller 812 drives PLL 820 to obtain appropriate center frequency. The DL frequency $f_{DL}$, is converted to a 28 GHz channel number by converter 824. In other embodiments, a mapping scheme may be used to extract a UL frequency $f_{UL}$ from a DL channel number.

According to yet another disclosed embodiment, a channel mapping scheme provides arbitrary mapping of the 5 and 28 GHz channels. Since multiple APs (e.g., A0, A1, . . . A15) on the same node (e.g., node 104) receive in the same 5 GHz band, it is beneficial to choose different channels in the 5 GHz band to avoid interference. Due to the unlicensed nature of the 5 GHz band, the occupancy of the channels may be quite different. Each channel at a different location may experience a markedly different level of interference. According to the disclosed embodiments, different APs on the same node may dynamically choose a different [DL, UL] channel mapping. Thus, APs A0-A15 on node 104 may dynamically choose a different [DL, UL] mapping, and APs B0-B15 on node 108 may dynamically chose a different [DL, UL] mapping. Also, a different UL channel for the same DL can be chosen, and vice versa.

Figure 9:
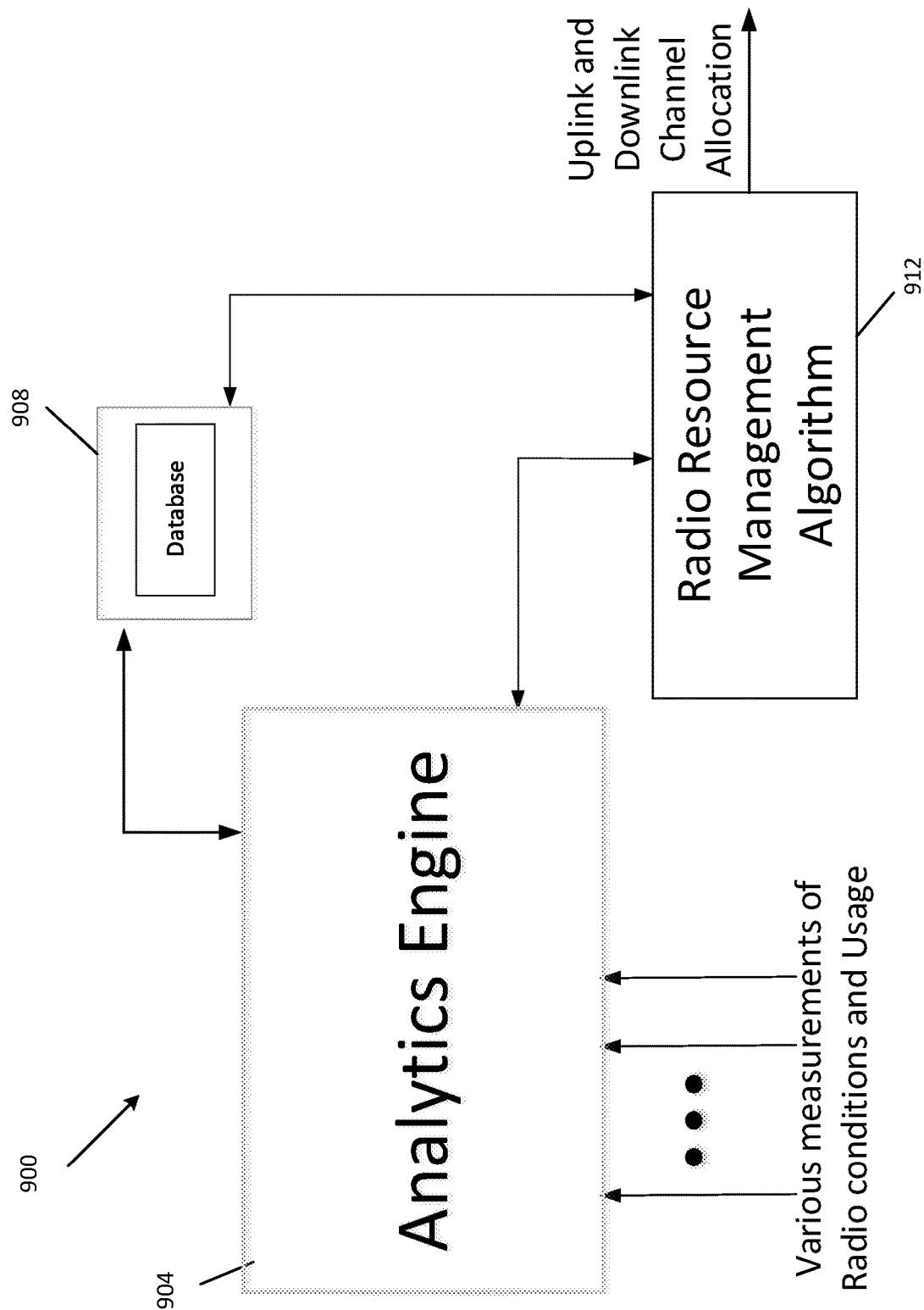
FIG. 9 illustrates a system for radio resource management.

FIG. 9 illustrates system 900 for radio resource management according to disclosed embodiments. System 900 requests and receives various parameters of radio conditions and channel usage, and based on the received parameters allocates UL and DL frequency bands for the radio units.

Referring now to FIG. 9, System 900 includes analytics engine 904 which requests and receives various parameters from client devices and APs. The received parameters may be stored in database 908. The parameters include measurements of radio conditions and usage (e.g., RSSI, S/N, packet error rate, bit error rate, etc.). System 900 includes radio resource management algorithm unit 912 which applies algorithms to the stored parameters and computes UL and DL channel allocations for the APs. The UL and DL channel allocations are sent to the respective APs.

Figure 10:
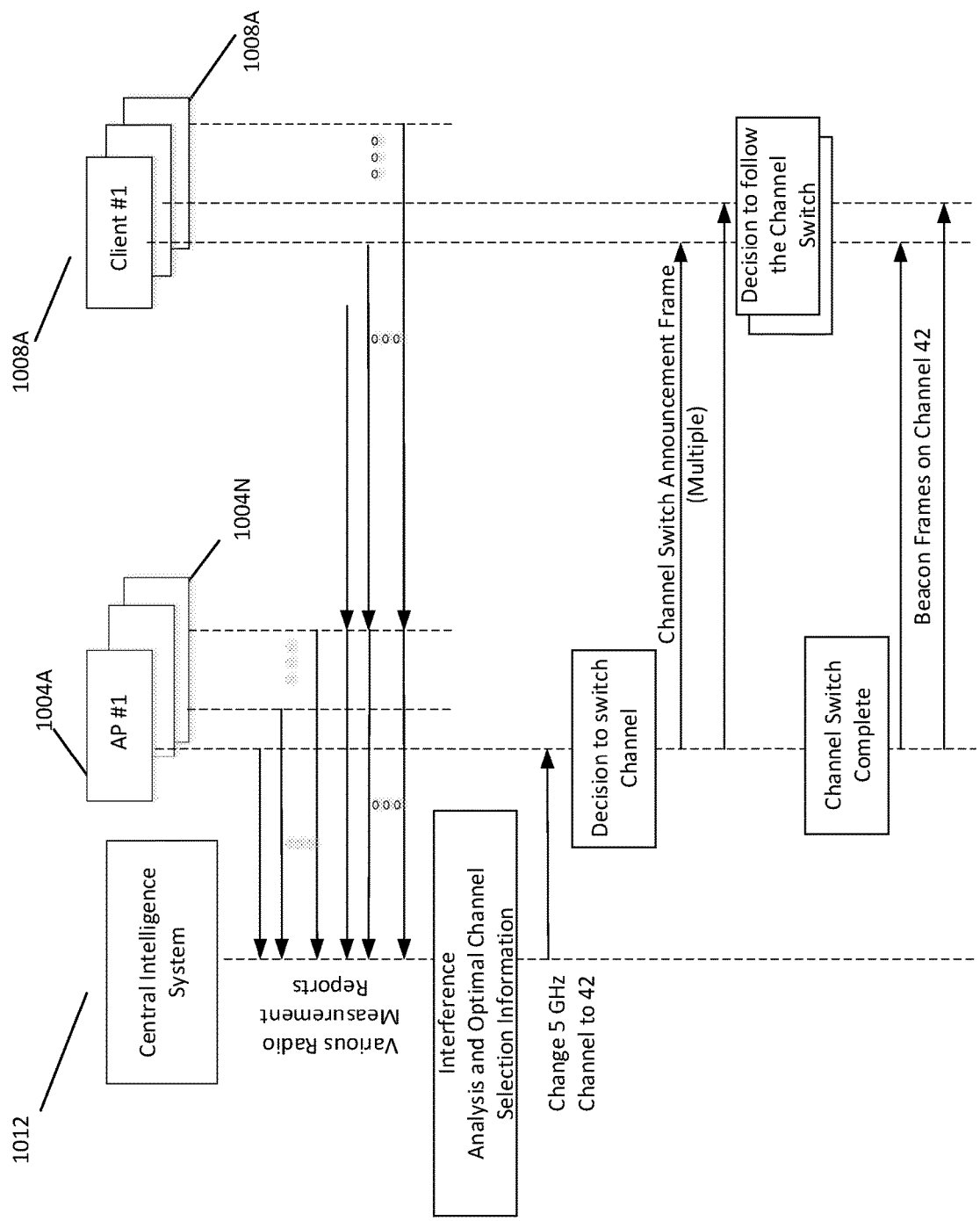
FIG. 10 illustrates a message sequence flow for channel mapping.

According to disclosed embodiments, a signaling scheme is used to enable a client device which receives packets from an access point on a 28 GHz DL channel to transmit response packets on a 5 GHz UL channel that the access point is listening on. FIG. 10 illustrates an exemplary message sequence flow embodying a high level signaling scheme to realize a fully dynamic and unrestricted channel mapping.

As shown in FIG. 10, a plurality of APs 1004A-1004N and client devices 1008A-1008N report radio conditions to central intelligence system 1012. Based on the radio conditions, central intelligence system 1012 computes UL and DL channel allocations and communicates the UL and DL channel allocations to APs 1004A-1004N. APs 1004A-1004N in turn transmit the channel allocation information to client devices that are attached to them.

In the exemplary illustration of FIG. 10, central intelligence system 1012 communicates with one of the APs (e.g., AP 1004A) to change the 5 GHz channel to 42. In this example, the 28 GHz channel remains unchanged. In other words, AP 1004A is requested to change the UL channel to channel #42 and thus receive UL packets on 5 GHz channel #42 from client devices but continue to send DL packets on the same 28 GHz channel.

A station management entity (SME) in the APs decides to switch the 5 GHz DL channel to channel #42, upon which it sends "channel switch announcement" messages prior to physically moving to the new channel (channel #42). The SME on the client device side adheres to this channel switch command by switching to the new channel.

Figure 11:
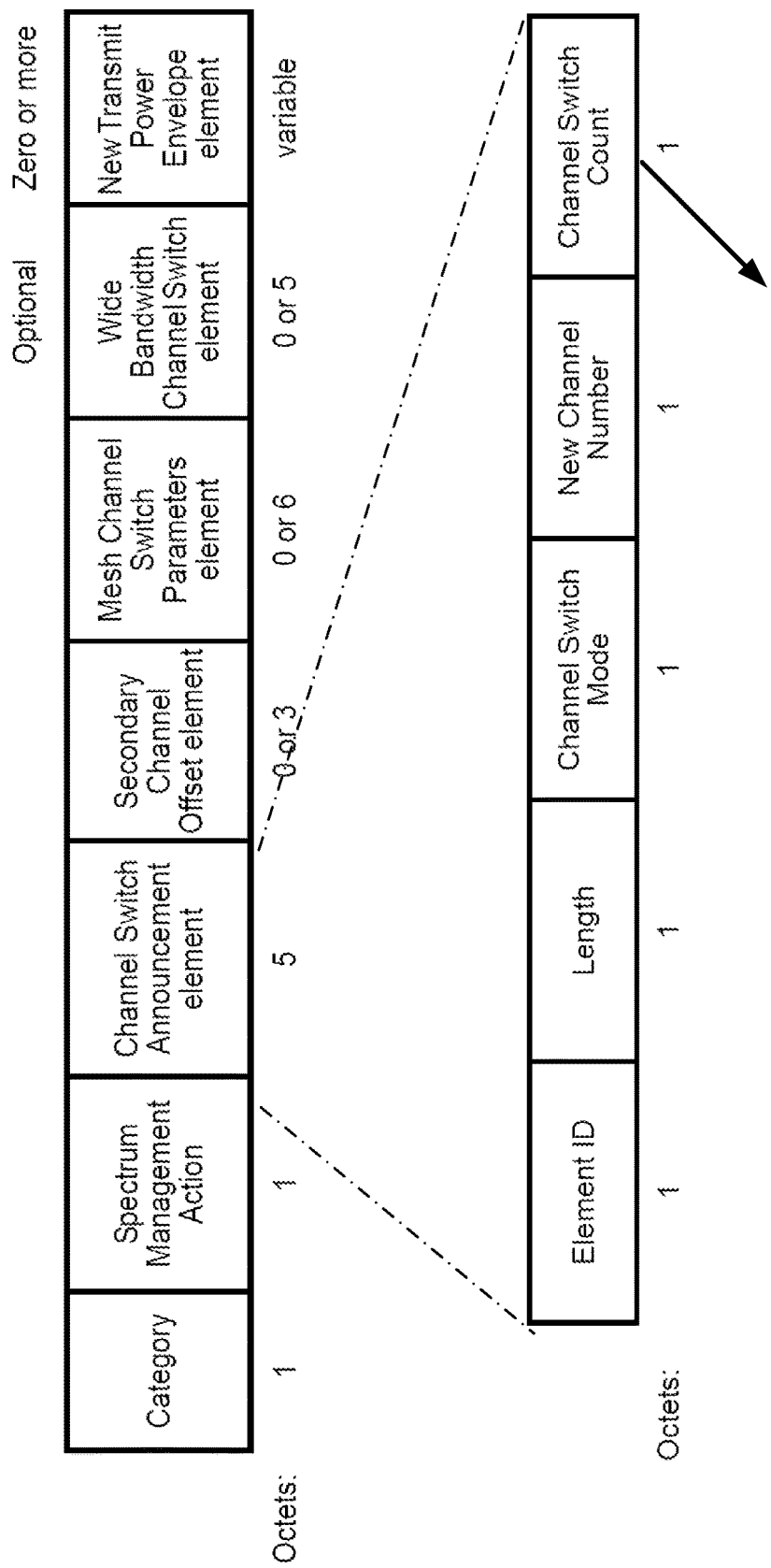
FIG. 11 illustrates 802.11 channel switch announcement packet format.

FIG. 11 illustrates a channel switch announcement packet format used in 802.11 systems. The channel switch announcement packet contains a "Channel Switch Announcement element" which in turn contains the "New channel number" as well as the "Channel Switch Count" which indicates the remaining time until the actual channel switch.

Figure 12:
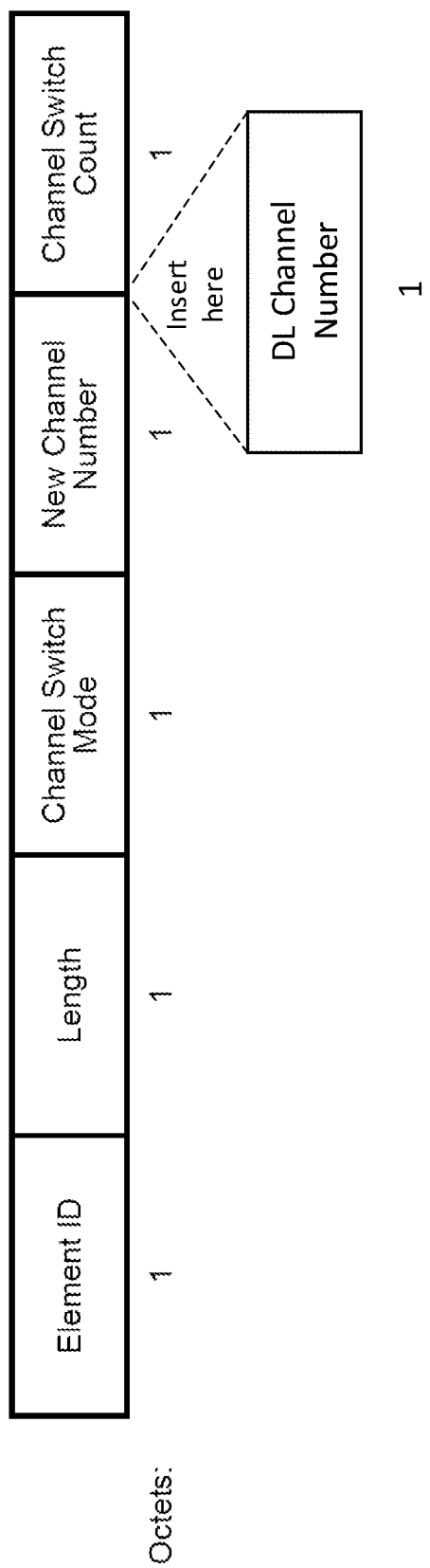
FIG. 12 illustrates an additional field to accommodate two channel numbers.

According to disclosed embodiments, an additional signaling field can be added to the channel switch announcement element that signals the 28 GHz DL channel number. FIG. 12 illustrates the additional field that can be used to accommodate two channel numbers (one for the UL to keep 5 GHZ format and one for the DL.

According to disclosed embodiments, a client device entering a network performs channel mapping discovery during a scanning phase. A scanning phase is a process by which a station discovers an AP and its attributes. In a passive scanning, the client device switches the channels and scans for beacons. During the scanning phase, the client device may use any pre-determined mapping between the 28 GHz and the 5 GHz channels (which may not be the correct mapping). Once the client device finds a beacon, it reads the 5 GHz channel number from the beacon, then corrects its channel mapping accordingly. For example, a client device entering the network may initially use the channel mapping discussed before. While scanning, the client device finds a beacon on channel 36 (Ch. 36 at 5 GHz is associated with Ch. 1 at 28 GHz), and then reads the channel number field (e.g., channel 60) in the beacon. Next, the client device updates its mapping, and associates Ch. 60 at 5 GHz with Ch. 1 at 28 GHz in accordance with the mapping.

According to disclosed embodiments, a client device entering the network performs channel mapping discovery using active scanning. The client device sends a Probe Request to an access point, and listens for a Probe Response assuming a given mapping. If the client device hears a Probe Response, the client device reads the channel number in the Probe Response and updates its mapping. Otherwise, the client device attempts another mapping and repeats until the client device successfully hears a Probe Response.

According to disclosed embodiments, a channel mapping element is added to the Probe Request message (e.g., the 28 GHz channel number). A receiver which receives the Request reads the channel mapping element and sends a Probe Response on the indicated 28 GHz channel. The Probe Response may carry information to enable the client device to update its mapping.

Figure 13:
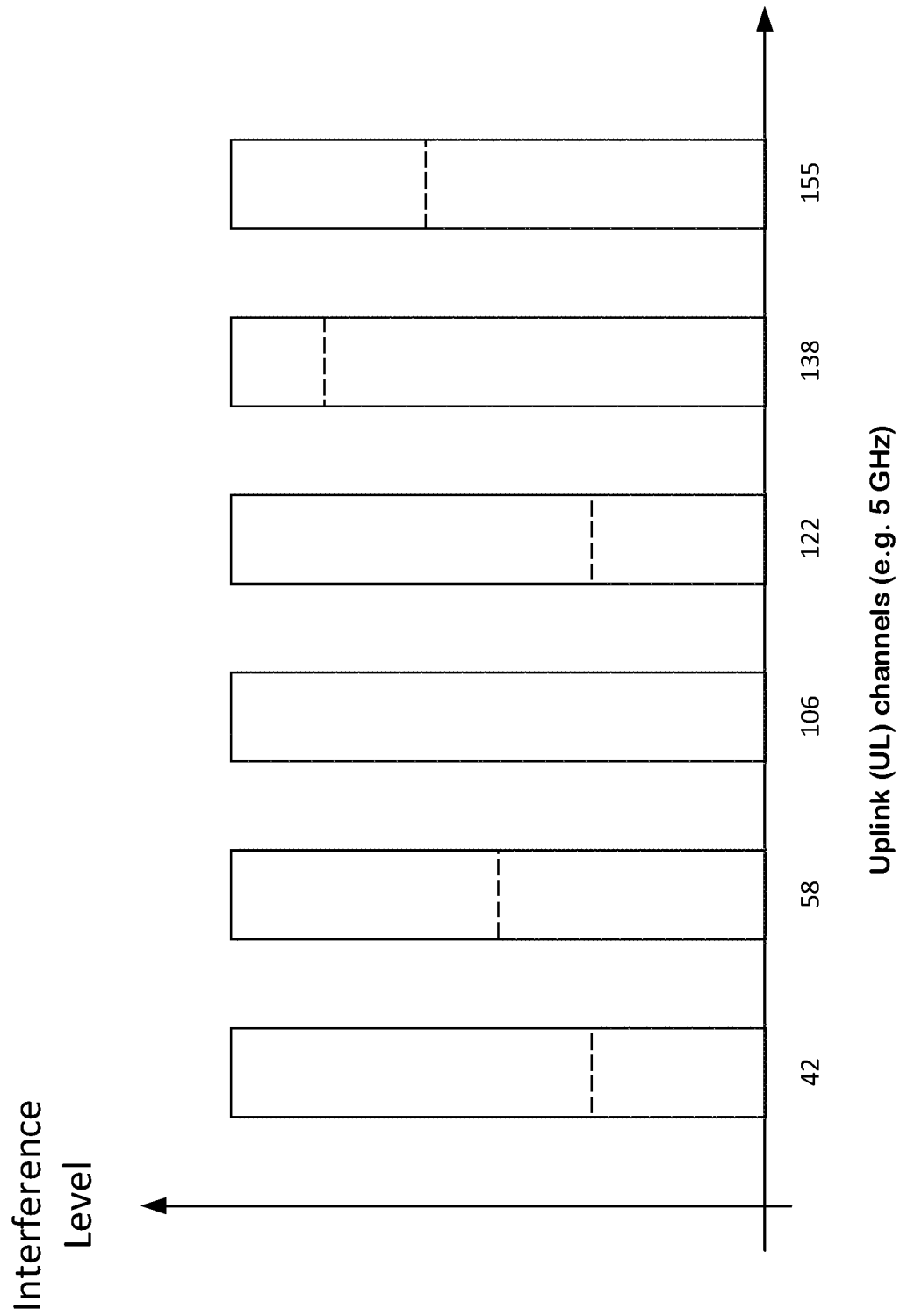
FIG. 13 illustrates exemplary interference levels measured for UL channels.

According to disclosed embodiments, a method for radio resource management selects optimum UL/DL channel pairs. A central intelligence system, such as the central intelligence system shown in FIG. 10, receives channel measurements indicating interference levels for available channels. FIG. 13 shows exemplary interference levels measured for UL channels 42, 58, 122, 138 and 155 that are received by the central intelligence system.

Figure 14:
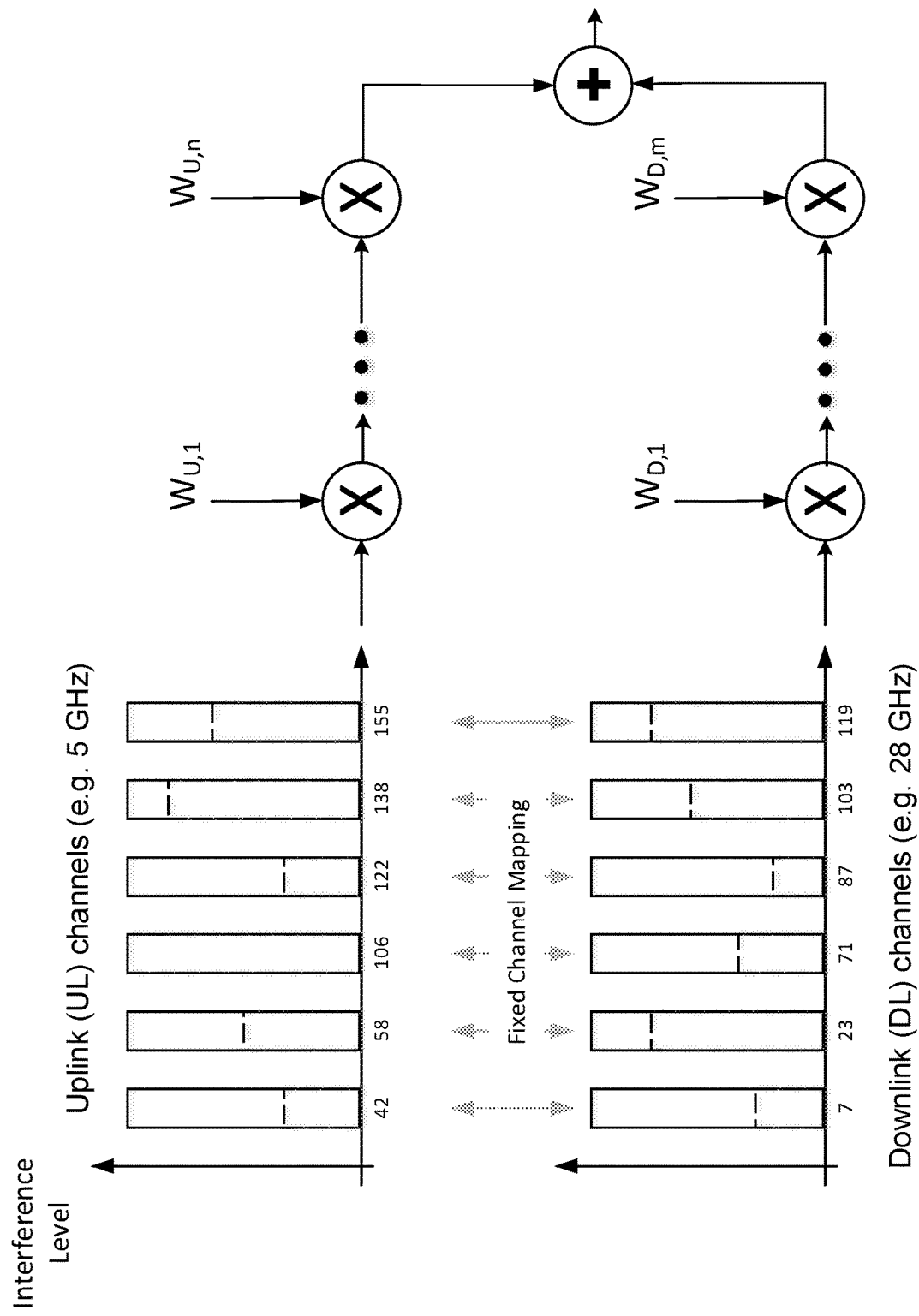
FIG. 14 illustrates a selection of UL and DL channel pair for a fixed channel mapping.

FIG. 14 illustrates the selection of DL and UL channel pair for a fixed channel mapping according to disclosed embodiments. As shown in FIG. 14, a predetermined fixed channel mapping scheme maps the following UL/DL channel pairs: 42/7; 58/23; 106/71; 122/87; 138/103; 155/119. Measured interference levels for UL channels are weighted by weights Wu,1-Wu,n. Similarly, measured interference levels for DL channels are weighted by weights WD,1-WD,m. Next, the weighted interference levels for the UL and DL channels are added. According to some disclosed embodiments, the channel pair providing the minimum interference may be chosen as the optimum UL/DL channel pair.

Figure 15:
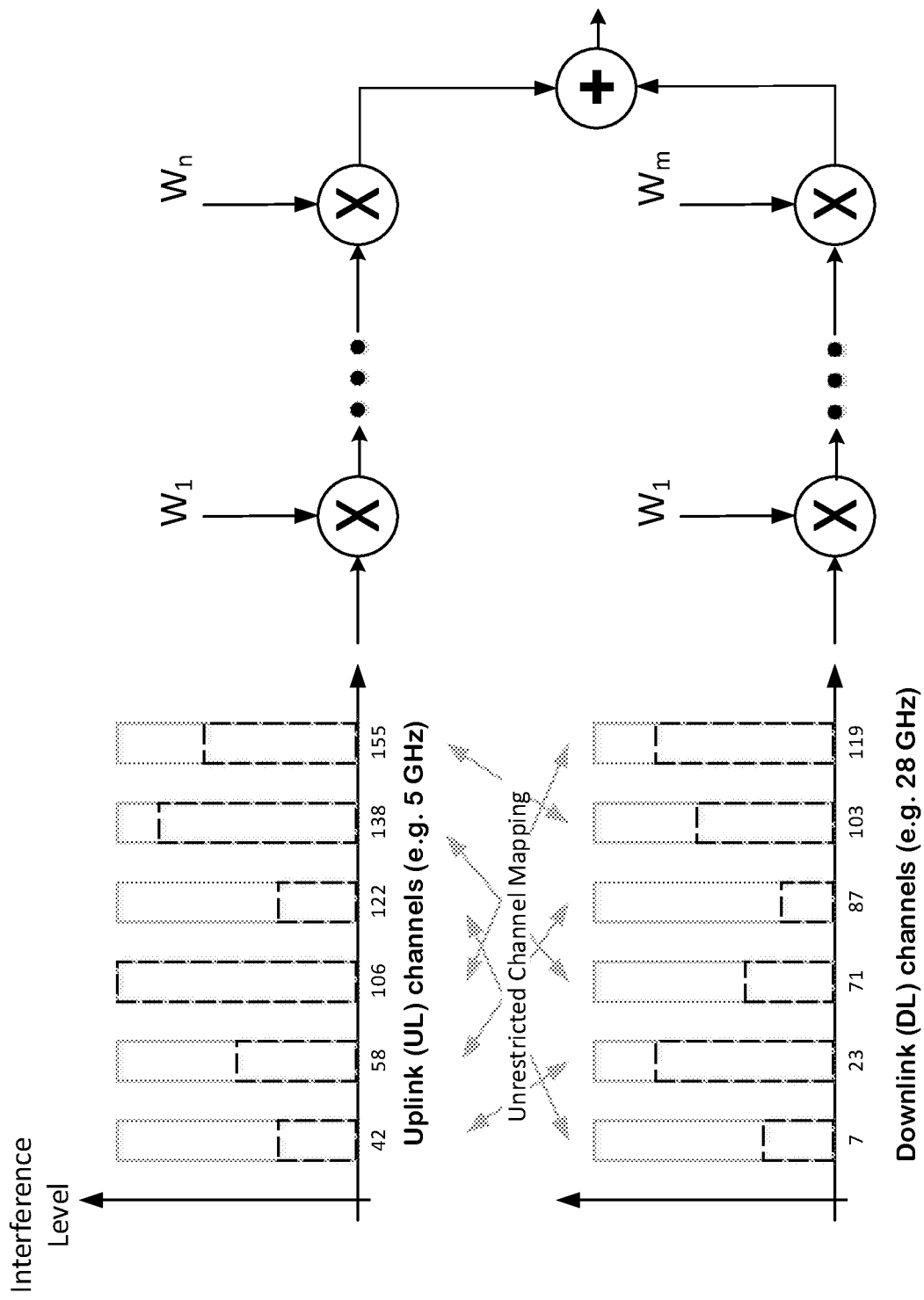
FIG. 15 illustrates a selection of DL and UL channel pair for a dynamic channel mapping.

FIG. 15 illustrates the selection of DL and UL channel pair for a dynamic channel mapping according to disclosed embodiments. In case of a dynamic mapping where there is no restriction on the DL/UL channel mapping, any available channel on the DL can be mapped to any available channel on the UL. Thus, all combinations of the DL/UL channels can be evaluated to yield the optimum DL/UL channel pair.

As shown in FIG. 15, measured interference levels for UL channels are weighted by weights Wu,1-Wu,n. Similarly, measured interference levels for DL channels are weighted by weights WD,1-WD,m. Next, the weighted interference levels for the UL and DL channels are added. According to some disclosed embodiments, the channel pair providing the minimum interference may be chosen as the UL/DL channel pair.

According to disclosed embodiments, channel numbers associated with selected UL/DL channel pairs are transmitted to the client devices in a packet format. For example, channel numbers associated with the selected UL/DL channel pairs may be transmitted by an access point to the client devices in a packet format which contains a plurality of fields, wherein one field in the packet may include the UL channel number and another field in the packet may include the DL channel number. In other embodiments, the UL channel number may be included in a data packet while the DL channel number may be included in a separate data packet.

Those skilled in the art will recognize that, for simplicity and clarity, the full structure and operation of all systems suitable for use with the present disclosure is not being depicted or described herein. Instead, only so much of a system as is unique to the present disclosure or necessary for an understanding of the present disclosure is depicted and described. The remainder of the construction and operation of the disclosed systems may conform to any of the various current implementations and practices known in the art.

Of course, those of skill in the art will recognize that, unless specifically indicated or required by the sequence of operations, certain steps in the processes described above may be omitted, performed concurrently or sequentially, or performed in a different order. Further, no component, element, or process should be considered essential to any specific claimed embodiment, and each of the components, elements, or processes can be combined in still other embodiments.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Those skilled in the art to which this application relates will appreciate that other and further additions, deletions, substitutions and modifications may be made to the described embodiments.

What is claimed is:

1. A method of communication between a base station and client devices in a wireless communication network, the method comprising:

transmitting from the base station to a client device on a downlink (DL) frequency band, wherein the DL frequency band is in the millimeter wave band, and the DL frequency band is the 28 GHz frequency band;

receiving from the client devices on an uplink (UL) frequency band, wherein the UL frequency band is in the 5 GHz band, wherein the DL frequency is higher than the UL frequency, and wherein the DL frequency band is separated from the UL frequency band by at least 10 GHz; and based on receiving requested parameters of radio conditions associated with channel usage from the client devices and the base station:

assigning DL and UL frequency pairs for the base station according to a fixed channel mapping scheme that assigns fixed DL and UL frequency pairs, wherein the assigning of the fixed DL and UL frequency pairs includes maintaining a difference between the DL and UL center frequency that is fixed, the base station selecting a first channel number in the 28 GHz band for DL transmission when the base station receives a UL transmission on a second channel in the 5 GHz band, and the first and second channel numbers being predefined channels that are pre-mapped to each other for the 28 GHz band, the pre-mapping including weighting according to measured interference levels in order to choose the fixed DL and UL frequency pairs, the fixed DL and UL frequency pairs providing a minimum interference; and communicating the DL and UL frequency pair assignments to the base station.

2. The method of claim 1, wherein the client device is a mobile communication device.

3. The method of claim 1, wherein the client device is a computing device.

4. A method of communication between a base station and client devices in a wireless communication network, the method comprising:

transmitting from the base station to a client device on a downlink (DL) frequency band, wherein the DL frequency band is in the millimeter wave band, and the DL frequency band is the 28 GHz frequency band;

receiving from the client device on an uplink (UL) frequency band, wherein the UL frequency band is in the 5 GHz frequency band, wherein the DL frequency is higher than the UL frequency, and wherein the DL frequency band is separated from the UL frequency band by at least 10 GHz; and based on receiving requested parameters of radio conditions associated with channel usage from the client devices and the base station:

assigning DL and UL frequency pairs to the base station according to a fixed channel mapping scheme that assigns fixed DL and UL frequency pairs, wherein the assigning of the fixed DL and UL frequency pairs includes maintaining a difference between the DL and UL center frequency that is fixed, the base station selecting a first channel number in the 28 GHz band for DL transmission when the base station receives a UL transmission on a second channel in the 5 GHz band, and the first and second channel numbers being predefined channels that are pre-mapped to each other for the 28 GHz band, the pre-mapping including weighting according to measured interference levels in order to choose the fixed DL and UL frequency pairs, the fixed DL and UL frequency pairs providing a minimum interference; and communicating the DL and UL frequency pair assignments to the base station.

5. The method of claim 4, wherein the client device is a mobile communication device.

6. The method of claim 4, wherein the client device is a computing device.

7. A method of communication between a base station and client devices in a wireless communication network, the method comprising:

transmitting from the base station to a client device on a downlink (DL) frequency band, wherein the DL frequency band is in the millimeter wave band, and the DL frequency band is the 28 GHz frequency band;

receiving from the client devices on an uplink (UL) frequency band, wherein the UL frequency band is in the 5 GHz frequency band, wherein the DL frequency is higher than the UL frequency, and wherein the DL frequency band is separated from the UL frequency band by at least 10 GHz; and based on receiving requested parameters of radio conditions associated with channel usage from the client devices and the base station:

assigning DL and UL frequency pairs to the base station according to a fixed channel mapping scheme that determines DL and UL frequency pairs based on a plurality of channel parameters, wherein the assigning of the fixed DL and UL frequency pairs includes maintaining a difference between the DL and UL center frequency that is fixed, the base station selecting a first channel number in the 28 GHz band for DL transmission when the base station receives a UL transmission on a second channel in the 5 GHz band, and the first and second channel numbers being predefined channels that are pre-mapped to each other for the 28 GHz band, the pre-mapping including weighting according to measured interference levels in order to choose the fixed DL and UL frequency pairs, the fixed DL and UL frequency pairs providing a minimum interference; and communicating the DL and UL frequency pair assignments to the base station.

8. The method of claim 7, wherein the channel parameters include received signal strength indicator (RSSI).

9. The method of claim 7, wherein the channel parameters include a signal to noise (S/N) ratio.

10. The method of claim 7, wherein the channel parameters include channel capacity and bit error rate (BER).

11. A method of transmitting channel numbers associated with downlink (DL) and uplink (UL) frequency pairs to client devices for communication between a base station in a node and the client devices, the method comprising:

assigning DL and UL frequency pairs to the base station according to a fixed channel mapping scheme that allocates fixed DL and UL frequency pairs, wherein the DL frequency is in the millimeter wave band, the DL frequency band is the 28 GHz frequency band and the UL frequency is in the 5 GHz band, wherein the difference between the DL and UL center frequency is fixed, wherein the DL frequency is higher than the UL frequency, and wherein the DL frequency band is separated from the UL frequency band by at least 10 GHz;

based on receiving requested parameters of radio conditions associated with channel usage from the client devices and the base station:

the assigning further including the base station selecting a first channel number in the 28 GHz band for DL transmission when the base station receives a UL transmission on a second channel in the 5 GHz band, and the first and second channel numbers being predefined channels that are pre-mapped to each other for the 28 GHz band, the pre-mapping including weighting according to measured interference levels in order to choose the fixed DL and UL frequency pairs, the fixed DL and UL frequency pairs providing a minimum interference; and transmitting the assigned channel numbers of the allocated DL and UL frequency pairs to the client devices.

\* \* \* \* \*